US012603900B2

(12) United States Patent
    Parla

(10) Patent No.:     US 12,603,900 B2
(45) Date of Patent:        Apr. 14, 2026

(54) FULLY AUTOMATED PEN TESTING WITH SECURITY POLICY CORRECTION USING GENERATIVE LLM

(71) Applicant: Cisco Technology, Inc., San Jose, CA (US)

(72) Inventor: Vincent Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 18/470,021

(22) Filed: Sep. 19, 2023

(65) Prior Publication Data

US 2025/0097237 A1     Mar. 20, 2025

(51) Int. Cl.
    *H04L 9/40*        (2022.01)
    *H04L 41/16*      (2022.01)
    *G06F 11/1446*  (2026.01)
    *G06F 11/30*      (2006.01)

(52) U.S. Cl.
    CPC .......... *H04L 63/1416* (2013.01); *H04L 41/16* (2013.01); *H04L 63/20* (2013.01); *G06F 11/1469* (2013.01); *G06F 11/302* (2013.01)

(58) Field of Classification Search
    CPC .............. G06F 16/1752; G06F 11/302; G06F 11/1469; G06F 18/23
    See application file for complete search history.

(56) References Cited

U.S. PATENT DOCUMENTS

| | | | | |
|---|---|---|---|---|
| 11,722,510 | B2 * | 8/2023 | Lewis ................. | H04L 63/1416 726/22 |
| 11,770,409 | B2 * | 9/2023 | Beaver .................... | G06F 18/23 |
| 11,782,800 | B2 * | 10/2023 | Cameron ............ | G06F 11/1469 711/162 |
| 11,874,930 | B2 * | 1/2024 | Rieger ................. | G05B 23/024 |
| 11,882,094 | B2 * | 1/2024 | Spurlock ............... | G06F 11/302 |
| 12,093,386 | B2 * | 9/2024 | Bedhapudi .......... | G06F 16/1752 |
| 2020/0159624 | A1 * | 5/2020 | Malkov .................. | G06N 20/00 |

FOREIGN PATENT DOCUMENTS

| | | |
|---|---|---|
| CN | 115473706 | 12/2022 |
| WO | 2020046575 | 3/2020 |

OTHER PUBLICATIONS

Happe et al., "Getting Pwn'd by AI: Penetration Testing With Large Language Models," arxiv.org, Aug. 17, 2023, pp. 1-5.

* cited by examiner

*Primary Examiner* — Barbara B Anyan
(74) *Attorney, Agent, or Firm* — Polsinelli P.C.

(57) ABSTRACT

In one aspect, a method for penetration testing for optimization of network security policies is disclosed. The method includes determining, by a security management service, that one or more cybersecurity threats successfully penetrated a security service protecting a pseudo-target in a penetration testing environment, analyzing, by the security management service, the one or more cybersecurity threats that successfully penetrated the security service to characterize the one or more cybersecurity threats, and generating, by the security management service, an update of a policy used by the security service that would prevent the one or more cybersecurity threats from penetrating the security service based on the analysis of the one or cybersecurity threats.

20 Claims, 7 Drawing Sheets

300

DETERMINING, BY A SECURITY MANAGEMENT SERVICE, THAT ONE OR MORE CYBERSECURITY THREATS SUCCESSFULLY PENETRATED A SECURITY SERVICE PROTECTING A PSEUDO-TARGET IN A PENETRATION TESTING ENVIRONMENT     302

ANALYZING, BY THE SECURITY MANAGEMENT SERVICE, THE ONE OR MORE CYBERSECURITY THREATS THAT SUCCESSFULLY PENETRATED THE SECURITY SERVICE TO CHARACTERIZE THE ONE OR MORE CYBERSECURITY THREATS     304

GENERATING, BY THE SECURITY MANAGEMENT SERVICE, AN UPDATE OF A POLICY USED BY THE SECURITY SERVICE THAT WOULD PREVENT THE ONE OR MORE CYBERSECURITY THREATS FROM PENETRATING THE SECURITY SERVICE BASED ON THE ANALYSIS OF THE ONE OR CYBERSECURITY THREATS     306

FIG. 3

ENCODE BLOCK 410a

DECODE BLOCK 414a

FULLY AUTOMATED PEN TESTING WITH SECURITY POLICY CORRECTION USING GENERATIVE LLM

BACKGROUND

An increase in malicious attacks on networks gives rise to various challenges to ensure secure and effective communication between devices in a network. With increasing numbers of devices and access points on the network, comprehensive security strategies benefit from defenses at multiple layers of depth, with security layered across the network, the server, and the endpoints. Intrusion prevention systems can be employed to monitor a network for malicious or unwanted activity and can react, in real-time, to block, deny or prevent those activities.

Penetration testing, also known as pen testing, is a simulation of a cyber-attack conducted on a computer system to identify potential vulnerabilities and assess breach security. This simulation can help identify potential security vulnerabilities that are exploitable through malicious code injection or other attacks like SQL injection and cross-site scripting. By performing these tests, organizations can determine the effectiveness of their existing security protocols and processes, while using the results of these tests to create secure coding frameworks and proactive measures that protect against potential attacks.

In some cases, attackers can inject malicious code into existing applications, compromising security and accessing confidential data. This type of attack can be used in SQL injection or cross-site scripting attacks. Attackers can exploit vulnerabilities to steal user data or take control of a system. These attacks are difficult to detect because they can disguise themselves as legitimate code, making them a powerful and versatile attack vector. Organizations should regularly scan their systems for suspicious activity and implement a secure coding framework to protect against such attacks.

As such, it is important to ensure that organizations can expand pen testing beyond known attack vectors that have succeeded in other environments to find variations of attack vectors that have previously succeeded to get ahead of new variants. Additionally, automation of pen testing would further allow these organizations to be more proactive in their detection approach of known and unknown attack vectors.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example process for penetration testing for optimization of network security policies in accordance with some embodiments of the present technology.

DETAILED DESCRIPTION

Figure 1:
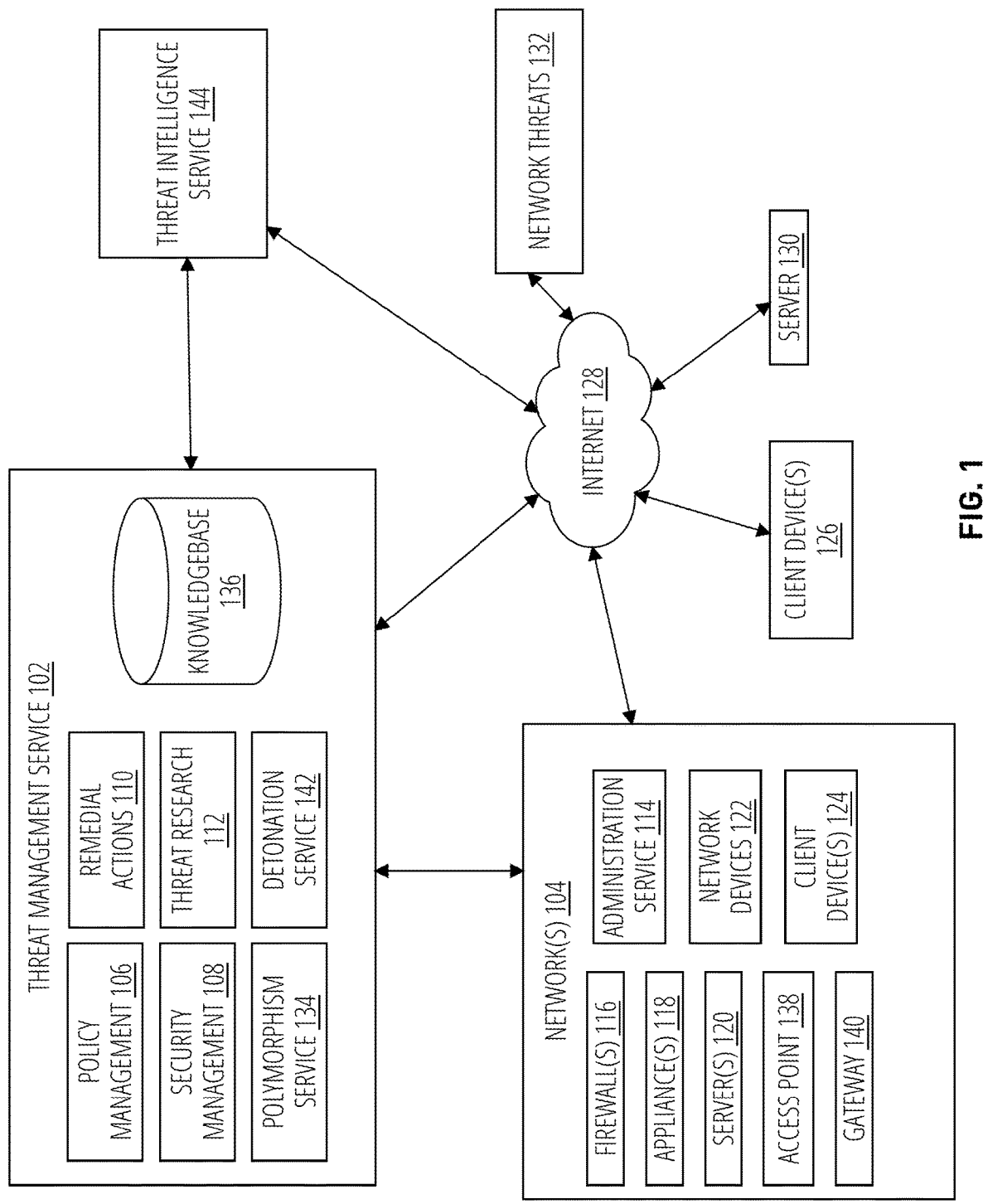
FIG. 1 illustrates an example threat management system in accordance with some embodiments of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Generative large language models (LLM) are important tools for preventing malware infections and performing threat management. These models can be used to detect malicious activity on a network by analyzing large volumes of data in real-time. By leveraging the power of machine learning, these models can identify anomalies or suspicious patterns that may indicate the presence of malware. In addition, they can also be used to detect known malicious code in files or network traffic. By using large language models, better visibility can be gained into wireless network systems to quickly detect and remove any threats in a preventative manner prior to subsequent damage to the network, network devices and to assist with maintaining the security of the network by protecting sensitive data from falling into the wrong hands.

The present disclosure is directed towards using an LLM for penetration testing to simulate cyber-attacks conducted on a computer system to identify potential vulnerabilities and assess breaches of security. Accordingly, the proposed technology includes taking export from a customer's environment in order to test a plurality of malware samples to identify which of the malware samples successfully penetrate the customer's ecosystem. Once a penetrating malware sample has been identified as successful, a notification can be transmitted and subsequently received, prompting an update to security controls and policies accordingly. The data relating to the penetrating malware sample can train the LLM to identify additional variants of potential malware samples to allow for rapid configuration changes in order to address any weak areas in their security environment. With regular pen testing, organizations can stay ahead of attackers and ensure the safety of their data over time.

In one aspect, a method for penetration testing for optimization of network security policies, the method includes determining, by a security management service, that one or more cybersecurity threats successfully penetrated a security service protecting a pseudo-target in a penetration testing environment, analyzing, by the security management service, the one or more cybersecurity threats that successfully penetrated the security service to characterize the one or more cybersecurity threats, and generating, by the security management service, an update of a policy used by the security service that would prevent the one or more cybersecurity threats from penetrating the security service based on the analysis of the one or cybersecurity threats.

In another aspect, the method includes analyzing one or more cybersecurity threats that successfully penetrated the security service and generating the update of the policy used by the security service is performed using a large language model (LLM).

In another aspect, the method includes where the LLM is aware of a current policy used by the security service, and the LLM is prompted to analyze the one or more cybersecurity threats, and to generate the update of the policy.

In another aspect, the method includes generating additional variants guided by the analyzing the one or more cybersecurity threats that successfully penetrated the security service.

In another aspect, the method includes deploying at least a portion of the additional variants to observe the additional variants in the penetration testing environment, analyzing results of the additional variants in the penetration testing environment, and applying the analysis of the results of the additional variants in the penetration testing environment aid the generating the update of the policy used by the security service.

In another aspect, the method includes deploying at least a portion of the additional variants to observe the additional variants in the penetration testing environment, where the penetration testing environment has been updated with the generated policy used by the security service that is intended to prevent the one or more cybersecurity threats from penetrating the security service.

In another aspect, the method includes where the security management service is configured to instruct the LLM to identify a plurality of patterns related to successful previous penetrations of the one or more cybersecurity threats, and provide a plurality of recommendations based on the plurality of patterns, where the plurality patterns identify patterns in one or more attack vectors.

In another aspect, the method includes where the security management service automatically initiates penetration testing based on the one or more cybersecurity threats that successfully penetrated the security service and identifies a set of updated adjustments to the policy, based on successful penetrations of the one or more cybersecurity threats.

In another aspect, the method includes where the security management service employs classifications of the one or more cybersecurity threats into one or more threat categories based on characterizations of each of the one or more cybersecurity threats, and automatically generates a threat score by evaluating a ranking of these classifications of the one or more cybersecurity threats.

In another aspect, the method includes where the threat score quantifies a risk level posed by each of the one or more cybersecurity threats and prioritizes one or more preventative actions to reduce the penetration of the one or more cybersecurity threats based on the threat score.

In another aspect, the method includes where the security management service utilizes the one or more characterizations of the one or more cybersecurity threats generated to generate security policies, encompassing adjustments to the policy automatically.

In one aspect, a network device includes one or more memories having computer-readable instructions stored therein. The network device also includes one or more processors configured to execute the computer-readable instructions to determine, by a security management service, that one or more cybersecurity threats successfully penetrated a security service protecting a pseudo-target in a penetration testing environment, analyze, by the security management service, the one or more cybersecurity threats that successfully penetrated the security service to characterize the one or more cybersecurity threats, and generate, by the security management service, an update of a policy used by the security service that would prevent the one or more cybersecurity threats from penetrating the security service based on the analysis of the one or cybersecurity threats.

In one aspect, a non-transitory computer-readable storage medium includes computer-readable instructions, which when executed by one or more processors of a network appliance, cause the network appliance to determine, by a security management service, that one or more cybersecurity threats successfully penetrated a security service protecting a pseudo-target in a penetration testing environment, analyze, by the security management service, the one or more cybersecurity threats that successfully penetrated the security service to characterize the one or more cybersecurity threats, and generate, by the security management service, an update of a policy used by the security service that would prevent the one or more cybersecurity threats from penetrating the security service based on the analysis of the one or cybersecurity threats.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Example Embodiments

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Cybersecurity is becoming increasingly important in today's digital world. With the rise of new technologies and compliance requirements, organizations must stay vigilant to protect themselves against evolving cyber threats. However, traditional security measures are often not enough to keep up with the pace of these threats. This is why it is essential for organizations to identify and address vulnerabilities before they can be exploited by malicious actors. By taking proactive measures to secure their systems, organizations can ensure that they are protected against cyber attacks and can continue to operate safely and securely in the digital landscape.

Penetration testing provides organizations with a comprehensive solution to the complex challenge of protecting their systems and data from cyberattacks. By simulating real-world attacks, penetration testing helps identify potential vulnerabilities and weak points that could be exploited by malicious actors. Furthermore, this approach can be used to proactively assess an organization's security measures prior to making changes or deploying new applications, as well as on an ongoing basis. Regular penetration testing ensures that security measures remain effective against evolving threats and can also help organizations meet compliance requirements. Additionally, this approach helps provide insights into the organization's security posture in advance of major audits or security incidents. By utilizing penetration testing to identify weaknesses, organizations can take a proactive stance against cyber threats and ensure optimal protection of their IT environment. This, in turn, enhances the organization's security posture and helps ensure that it remains resilient in the face of ever-evolving cyber threats.

Penetration testing can also be used to test incident response plans, raise organizational awareness of potential security threats, and assess an organization's overall security maturity. By combining these approaches, organizations can gain a comprehensive and integrated understanding of their security infrastructure in order to develop targeted solutions and strategies that address their cybersecurity risks. Ultimately, penetration testing provides organizations with the necessary tools to ensure that their systems and data remain secure against cyber threats.

Penetration testing offers additional advantages beyond identifying vulnerabilities. It serves as a valuable tool for assessing an organization's compliance requirements and validating policies related to privacy regulations and data protection. This dual benefit ensures that the organization not only fortifies its security measures but also upholds adherence to industry standards and regulatory frameworks, safeguarding user data from potential breaches. By integrating penetration testing into their security practices, organizations proactively address security vulnerabilities, bolster their systems against cyber threats, and concurrently fulfill their obligations to industry regulations.

Thus, the multifaceted benefits of penetration testing extend to compliance verification and data protection. This holistic approach empowers organizations to not only enhance their security infrastructure but also guarantee compliance with industry norms. By making penetration testing a fundamental component of their cybersecurity strategy, organizations fortify their resilience against evolving cyber threats while simultaneously meeting the stringent demands of regulatory mandates.

Penetration testing, while essential for cybersecurity, entails several intricate challenges that necessitate careful consideration. One such challenge is the potential disruption of production systems, which can introduce risks if not executed with meticulous planning and caution. Testing activities that put excessive stress on live systems can lead to downtime, data loss, or service interruptions, underscoring the need for a well-structured and coordinated approach to minimize these risks.

Another issue lies in the scope of penetration tests. While these tests are invaluable for assessing external threats, they may not comprehensively cover all threat vectors. Insider threats, for instance, can be difficult to simulate in a controlled environment. Social engineering attacks, which often exploit human psychology rather than technical vulnerabilities, may also receive limited attention.

Furthermore, it's crucial to acknowledge that while penetration tests offer valuable insights, they cannot perfectly emulate real-world conditions, due to the fact that penetration tests provide a mere snapshot of a system's security status at a specific moment in time. In the ever-evolving landscape of cyber threats, new vulnerabilities surface regularly, and threat actors continuously refine their tactics. Hence, it becomes imperative for penetration tests to be integrated into a more comprehensive security strategy, that encompasses continuous monitoring and periodic retesting, ensuring that security measures remain resilient in the face of evolving threats and the dynamic nature of network conditions.

The disclosed technology provides penetration testing that leverages LLM to provide significant advantages when developing plans to thwart potential cyberattacks in an ever-evolving landscape of cyber threats. In some examples, specialized plugins can be created for tools such as Metasploit in order to take advantage of the outputs generated from a particular attack vector. These payloads can include variants such as Remote Code Execution (RCE), Log 4J, or SQL injection payloads. Through analysis of the generated input, classification and threat scoring can be automated to identify preventative measures that need to be implemented, such as firewall or Intrusion Prevention System (IPS) adjustments or additional edge security policies based on successful penetration attempts. Additionally, systems can observe existing configurations and automatically tailor payloads with the intent of evading or bypassing current settings. This allows pen testing processes to be automated and more comprehensive in scope.

In addition, LLM-based penetration testing can help identify areas of vulnerability that would otherwise remain unseen. By creating a variety of malicious payloads, potential threats can be identified that may have been overlooked when using traditional techniques. This makes LLM an invaluable tool for identifying potential security issues and implementing solutions to prevent them in advance. Furthermore, LLM-based testing can be used to assess the long-term security of a system by evaluating how well it is able to withstand multiple attack attempts over time. By running simulations on different configurations, security teams can better understand which policies are working effectively and which ones may need to be tweaked for further protection.

The proposed technology can first take an export from a customer environment in order to run test variants and detect which ones penetrate the ecosystem of the customer's environment. Once a test variant has been determined to bypass the pseudo-target/firewall/security appliance successfully, a notification is generated that prompts an update of security controls and policies in order to compensate for what was penetrated in the test system. This is used to create more effective variants, allowing rapid configuration changes to be made and address any weak areas in the security environment.

When combined with penetration testing to identify additional variants of malware, the integration of a Large Language Model (LLM) brings an arsenal of capabilities to the table for thwarting potential cybersecurity attacks. Leveraging its code summarization processing capabilities, an LLM can meticulously analyze the patterns and attributes of these new malware variants. This analytical prowess enables the identification of nuanced similarities and trends even in previously successful penetrations of the security system. As a result, the LLM contributes to early detection and classification, ensuring that security teams can swiftly recognize potential threats and respond with targeted countermeasures.

In some examples, a threat management service can use LLM to identify differences between original malware and newly detected malware. This helps avoid the need to predict and test numerous modifications. The differences can then be used to explain/classify what techniques have been employed by the attacker to bypass detection, to identify remediation techniques to thwart the potential malware attack taking place, or future network threats. This also limits the number of possible iterations in predicting further modifications that may be attempted.

Moreover, the predictive analysis capability of LLMs comes into play, as they can forecast the possible impact and propagation of these new malware variants. By cross-referencing their attributes with historical attack data, LLMs aid security teams in assessing risks and prioritizing responses. This technology proves invaluable in generating customized signatures or behavioral indicators specific to the newly identified malware variants. These signatures can be seamlessly integrated into intrusion detection systems, firewalls, and antivirus solutions, actively neutralizing future attempts.

One way to forecast malware impact is preparing a graph of historical penetration data. Graphs convey complex information about security threats, including behavioral patterns for detection and analysis. Threat management services can use the graph in an LLM to identify differences between original and newly detected malware that has penetrated the security system. The differences in techniques used by attackers can help identify how to prevent malware attacks and future network threats through updates to configurations and policies. This limits the number of iterations in predicting modifications, due to the fact that the LLM maps differences to classifications like MITRE ATT&CK framework.

LLMs can also lend a hand in automating response recommendations. Drawing from their extensive analysis, LLMs can offer actionable suggestions for responding to the identified malware variants. This can encompass fine-tuning firewall rules, adjusting intrusion prevention settings, and modifying other security policies to defuse threats preemptively. Additionally, LLMs contribute to the training of adaptive security systems. By generating a diverse array of simulated attack scenarios, they enable the security management system to refine its ability to detect and combat emerging threats and continually defuse threats preemptively.

Furthermore, LLMs meticulously analyze text-based content found in phishing emails, malicious links, and other socially engineered tactics. This scrutiny helps in pinpointing manipulative language and behavioral triggers, thus enhancing the identification of potential threats. LLMs also shine in contextual understanding, comprehending and dissecting contextual information linked to the malware variants. This encompasses factors like their targeted industries or geographic locations, contributing to the tailoring of defenses according to specific threat landscapes.

In summary, combining LLMs with penetration testing creates a strong defense against cyber attacks. These models detect new malware and help organizations proactively counter threats, making them a critical asset in strengthening security management.

FIG. 1 illustrates an environment for threat management. Specifically, FIG. 1 depicts a block diagram of a threat management service 102 providing protection to one or more enterprises, networks, locations, users, businesses, etc., against a variety of threats. The threat management service 102 may be used to protect devices (e.g., IoT devices, appliances, services, client devices, or other devices) from computer-generated and human-generated threats.

The threat management service 102 is a malware analysis platform that discovers, identifies, analyzes, and tracks sophisticated threats. It provides an end-to-end workflow from intelligence gathering to multi-vector analysis, threat hunting, and response, resulting in real-time visibility into malicious behavior associated with known and unknown malware.

The threat management service 102 can perform dynamic sandboxing of suspicious files, control flow graph analysis, and memory scanning for detecting malicious activity. The threat management service 102 can accelerate the hunting and finding of threats by providing context for suspicious files, including the behavior of known threats that are tracked across various networks in order to identify associated malware campaigns.

In order to track threats, the threat management service 102 uses a combination of static analysis to examine code and look for telltale indicators that can indicate the presence of malicious code. As well as dynamic analysis to examine how the code behaves when it is executed. This allows the threat management service 102 to accurately identify samples of malware even if they are changed in form but not in function or modified to be difficult for humans or computers to understand (obfuscated).

As explained herein the threat management service 102 further uses detection of both Signature characterization and Behavioral characterizations to identify code as malicious or malware. Signature characterization detection works by scanning for known malware, relying on a database of known threats worldwide and their signatures. Behavioral characterization detection looks at how the code behaves when executed, allowing the threat management service 102 to detect unknown or newly created malware.

During detection, the threat management service 102 will look at the code, metadata, download history, and other information associated with the threat to determine whether or not it is malicious. If it is determined that the code is malicious, then the threat management service 102 will create a report that includes detailed information about the threat, such as its origin, type, risk level, and other related characteristics. Additionally, the report may contain indicators that can help identify the malware's spreading patterns and networks used to host the malicious content. The report can further provide any associated user actions or events occurring before the system detected the threat.

The report and analysis in threat management service 102 can further produce a variety of malware resolutions and solutions, such as blocking malicious URLs, killing malicious processes, quarantining affected files and systems, and disabling malicious services. Additionally, it can provide suggestions on how to improve an organization's security posture or alert administrators to new threats that they should be aware of.

The threat of malware or other compromises may be present at various points within a network 104 such as client devices 124, server 120, gateways 140, IoT devices, appliances 118, firewalls 116, etc. In addition to controlling or stopping malicious code, the threat management service 102 may provide policy management to control devices, applications, or user accounts that might otherwise undermine the productivity and network performance within the network 104.

The threat management service 102 may provide protection to network 104 from computer-based malware, including viruses, spyware, adware, trojans, intrusion, spam, policy abuse, advanced persistent threats, uncontrolled access, and the like. In general, the network 104 may be any networked computer-based infrastructure or the like managed by the threat management service 102, such as an organization, association, institution, or the like, or a cloud-based service. For example, the network 104 may be a corporate, commercial, educational, governmental, or other network, and may include multiple networks, computing resources, and other facilities, may be distributed among more than one geographical locations, and may include an administration service 114, a firewall 116, an appliance 118, a server 120, network devices 122 including access points 138 and a gateway 140, and endpoint devices such as client devices 124 or IoT devices.

The threat management service 102 may include computers, software, or other computing service supporting a plurality of functions, such as one or more of a security management service 108, a policy management service 106, a remedial action service 110, a threat research service 112, and the like. In some embodiments, the threat protection provided by the threat management service 102 may extend beyond the network boundaries of the network 104 to include client devices 124 that have moved into network connectivity not directly associated with or controlled by the network 104. Threats to client facilities may come from a variety of sources, such as network threats 132, physical proximity threats, and the like. Client device 124 may be protected from threats even when the client device 124 is not directly connected to or in association with the network 104, such as when a client device 124 moves in and out of the network 104, for example, when interfacing with an unprotected server 120 through the internet 128.

The threat management service 102 may use or may be included in an integrated system approach to provide the network 104 with protection from a plurality of threats to device resources in a plurality of locations and network configurations. The threat management service 102 may also or instead be deployed as a stand-alone solution for an enterprise. For example, some or all of the threat management service 102 components may be integrated into a server or servers on-premises or at a remote location, for example, in a cloud computing service. For example, some or all of the threat management service 102 components may be integrated into a server 120, firewall 116, gateway 140, appliance 118, or access point 138 within or at the border of the network 104. In some embodiments, the threat management service 102 may be integrated into a product, such as a third-party product (e.g., through an application programming interface), which may be deployed on endpoints, on remote servers, on internal servers or gateways for a network, or some combination of these.

The security management service 108 may include a plurality of elements that provide protection from malware to device resources of the network 104 in a variety of ways, including endpoint security and control, email security and control, web security and control, reputation-based filtering, control of unauthorized users, control of guest and non-compliant computers, and the like. The security management service 108 may also provide protection to one or more device resources of the network 104. The security management service 108 may have the ability to scan client service files for malicious code, remove or quarantine certain applications and files, prevent certain actions, perform remedial actions and perform other security measures. This may include scanning some or all of the files stored on the client service or accessed by the client service on a periodic basis, scanning an application when the application is executed, scanning data (e.g., files or other communication) in transit to or from a device, etc. The scanning of applications and files may be performed to detect known or unknown malicious code or unwanted applications.

The security management service 108 may provide email security and control. The security management service 108 may also or instead provide for web security and control, such as by helping to detect or block viruses, spyware, malware, unwanted applications, and the like, or by helping to control web browsing activity originating from client devices. In some embodiments, the security management service 108 may provide network access control, which may provide control over network connections. In addition, network access control may control access to virtual private networks (VPN) that provide communications networks tunneled through other networks. The security management service 108 may provide host intrusion prevention through behavioral-based analysis of code, which may guard against known or unknown threats by analyzing behavior before or while code executes. Further, or instead, the security management service 108 may provide reputation filtering, which may target or identify sources of code.

In general, the security management service 108 may support overall security of the network 104 using the various techniques described herein, optionally as supplemented by updates of malicious code information and so forth for distribution across the network 104. Information from the security management service 108 may also be sent from the enterprise back to a third party, a vendor, or the like, which may lead to improved performance of the threat management service 102. For example, threat intelligence service 144 can receive information about newly detected threats from sources in addition to the threat management service 102 and can provide intelligence on new and evolving threats.

The policy management service 106 of the threat management service 102 may be configured to take actions, such as to block applications, users, communications, devices, and so on based on determinations made. The policy management service 106 may employ a set of rules or policies that determine network 104 access permissions for one or more of the client devices 124. In some embodiments, a policy database may include a block list, a black list, an allowed list, a white list, or the like, or combinations of the foregoing, that may provide a list of resources internal or external to the network 104 that may or may not be accessed by the client devices 124. The policy management service 106 may also or instead include rule-based filtering of access requests or resource requests, or other suitable techniques for controlling access to resources consistent with a corresponding policy.

As threats are identified and characterized, the threat research service 112 may create updates that may be used to allow the threat management service 102 to detect and remediate malicious software, unwanted applications, con-figuration and policy changes, and the like. The threat research service 112 may contain threat identification updates, also referred to as definition files and can store these definition files in the knowledgebase 136. A definition file may be a virus identity file that may include definitions of known or potential malicious code. The virus identity definition files may provide information that may identify malicious code within files, applications, or the like. In some embodiments, the definition files can include hash values that can be used to compare potential malicious code against known malicious code. In some embodiments, the definition files can include behavior characterizations, such as graphs of malware behavior. In some embodiments, the threat research service 112 can detonate possible malware to create the behavioral characterizes to be included in the definition files.

The definition files may be accessed by the security management service 108 when scanning files or applications within the client service for the determination of malicious code that may be within the file or application. The definition files include a definition for a neural network or other recognition engine to recognize malware. The threat research service 112 may provide timely updates of definition files information to the knowledgebase 136, network 104, and the like.

In some embodiments, in addition to characterizing detected and known malware in the definition files, the threat research service 112 can utilize a polymorphism service 134 to attempt to improve the ability to recognize polymorphic variants of detected malware. In some embodiments, the polymorphism service 134 can make use of a generative large language model to create polymorphic variants of malware and determine if the polymorphic variants are detected by the security management service 108. When a polymorphic variant is not detected, the polymorphic variant can be detonated using detonation service 142. The threat research service 112 can store a hash value and any updates to the behavioral characterizations as part of the definitions files to ensure that the polymorphic variant of the malware will be detected if it is ever encountered.

The security management service 108 may be used to scan an outgoing file and verify that the outgoing file is permitted to be transmitted per rules and policies of the network 104. By checking outgoing files, the security management service 108 may be able to discover malicious code infected files that were not detected as incoming files. Additionally, the security management service 108 can generate outgoing files for data loss prevention against data loss prevention policies configured by the policy management service 106.

When a threat or policy violation is detected by the threat management service 102, the threat management service 102 may perform or initiate remedial action through the remedial action service 110. Remedial action may take a variety of forms, such as terminating or modifying an ongoing process or interaction, issuing an alert, sending a warning (e.g., to a client device 124 or to the administration service 114) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the client devices 124, quarantining a related application (or files, processes or the like), terminating the application or device, isolating the application or device, moving a process or application code to a sandbox for evaluation by the detonation service 142, isolating one or more of the client devices 124 to a location or status within the network that restricts network access, blocking a network access port from one or more of the client device 124, reporting the application to the administration service 114, or the like, as well as any combination of the foregoing.

In some embodiments, the threat intelligence service 144 offers intelligence on the latest threats and solutions for prevention. For example, the threat intelligence service 144 provides instructional data to all security devices such as threat management service 102 and provides information to create definition files to identify the latest threat to protect the network from newly detected attacks. The main advantage of the threat intelligence service 144 is the large amount of security network devices that can provide threat intelligence service 144 with data on detected and undetected threats. There can be many security devices across many different networks, enterprises, and vendors that can feed information to the threat intelligence service 144, and therefore threat intelligence service 144 has more data on threats than the threat management service 102. The threat intelligence service 144 collects data from many devices and adds to it all the data collected by partners to analyze vectors of new attacks. The threats are tracked using digital signatures that can be used in the definition files used by the threat management service 102

One type of signature is a Hash-Based signatures. These hashes are generated through dynamic sandboxing, control flow graph analysis, memory scanning, behavior-based detection, and other methods for identifying malicious code. The threat intelligence service 144 can then provide detailed reports with threat indicators that can help administrators track down malicious code and reduce their risk of infection.

Another type of signature is a Pattern Based Signatures or BASS (Automated Signature Synthesizer). BASS (Automated Signature Synthesizer) is a framework designed to automatically generate antivirus signatures from samples belonging to previously generated malware clusters. It is meant to reduce resource usage by producing more pattern-based signatures as opposed to hash-based signatures. Compared to pattern-based or bytecode-based signatures, hash-based signatures have the disadvantage of only matching a single file per signature. Pattern-based signatures are able to identify a whole cluster of files instead of just a single file.

The threat management service 102 may provide threat protection across the network 104 to devices such as the client devices 124, the servers 120, the administration service 114, the firewall 116, the access point 138, the gateway 140, one or more of the network devices 122 (e.g., hubs and routers), one or more of the appliances 118 (e.g., a threat management appliance), any number of desktop or mobile users, and the like in coordination with an endpoint computer security service. The endpoint computer security service may be an application locally loaded onto any device or computer support component on network 104, either for local security functions or for management by the threat management service 102 or other remote resource, or any combination of these.

The network 104 may include one or more of the servers 120, such as application servers, communications servers, file servers, database servers, proxy servers, mail servers, fax servers, game servers, web servers, and the like. In some embodiments, the threat management service 102 may provide threat protection to servers 120 within the network 104 as load conditions and application changes are made.

The client devices 124 may be protected from threats from within the network 104 using a local or personal firewall, which may be a hardware firewall, software firewall, or a combination thereof, that controls network traffic to and from a client. The local firewall may permit or deny communications based on a security policy.

The interface between the threat management service 102 and the network 104 to embedded endpoint computer security facilities, may include a set of tools that may be the same or different for various implementations and may allow network administrators to implement custom controls. In some embodiments, these controls may include both automatic actions and managed actions. The administration service 114 may configure policy rules that determine interactions.

Interactions between the threat management service 102 and the components of the network 104, including mobile client service extensions of the network 104, may ultimately be connected through the internet 128 or any other network or combination of networks. Security-related or policy-related downloads and upgrades to the network 104 may be passed from the threat management service 102 through to components of the network 104 equipped with the endpoint security management service 108. In turn, the endpoint computer security management services 108 of the enterprise threat management service 102 may upload policy and access requests back across the internet 128 and through to the threat management service 102. The internet 128, however, is also the path through which threats may be transmitted from their source, and one or more of the endpoint computer security facilities may be configured to protect a device outside the network 104 through locally-deployed protective measures and through suitable interactions with the threat management service 102.

Thus, if the mobile client service were to attempt to connect to an unprotected connection point that is not a part of the network 104, the mobile client service, such as one or more of the client devices 124, may be required to request network interactions through the threat management service 102, where contacting the threat management service 102 may be performed prior to any other network action. In embodiments, the endpoint computer security service of the client device 124 may manage actions in unprotected network environments such as when the client service (e.g., the client device 126) is in a secondary location, where the endpoint computer security service may dictate which applications, actions, resources, users, etc. are allowed, blocked, modified, or the like.

Figure 2:
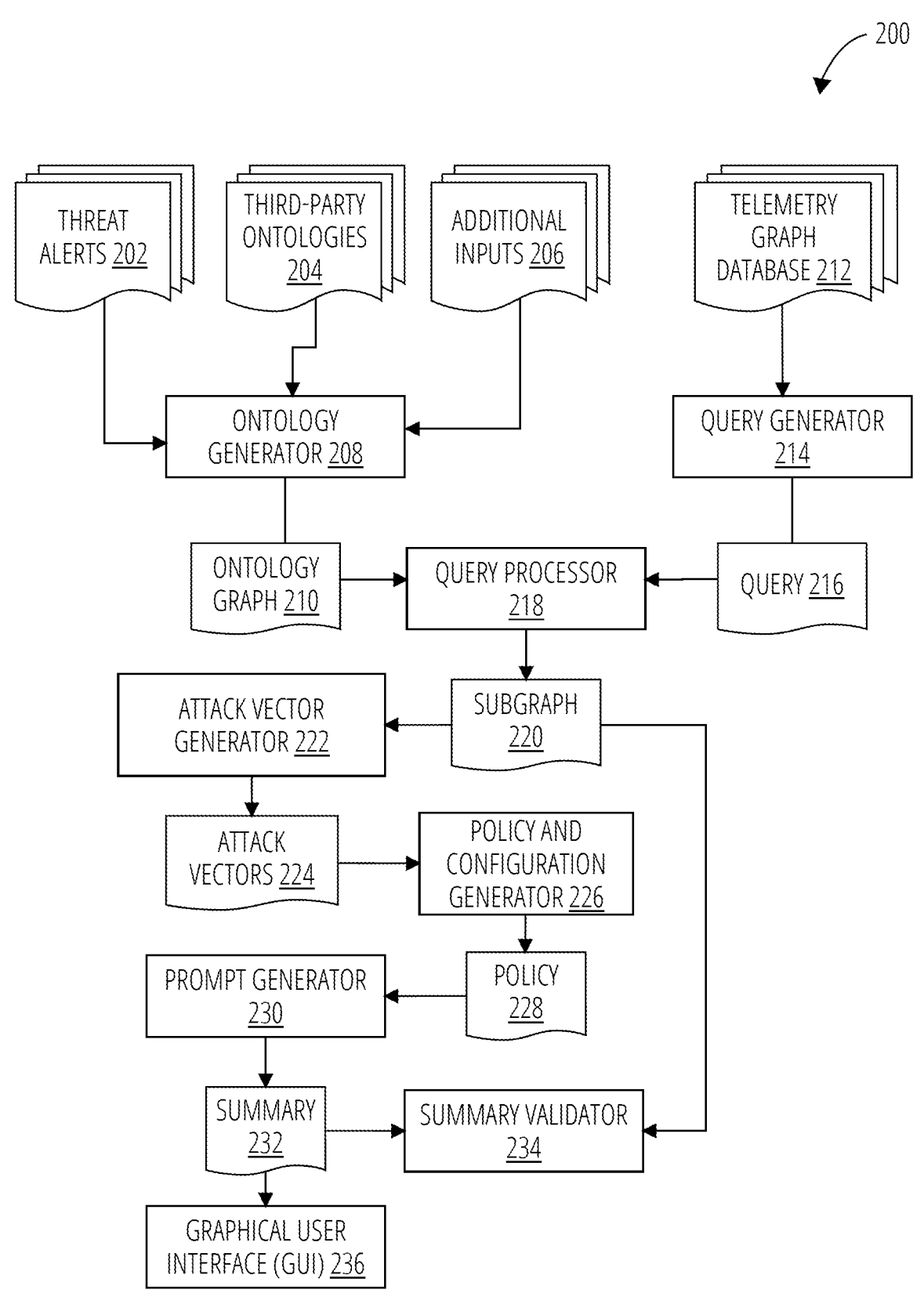
FIG. 2 illustrates a block diagram for an example of a system/device for providing a text summary of the information conveyed by a graph related to a security alert in accordance with some embodiments of the present technology.

FIG. 2 shows an example of an ontology summary system 200 that generates prompts summarizing the security incident giving rise to a threat alert. The ontology summary system 200 has an ontology generator 208 that receives various inputs, including, e.g., a threat alerts 202, a third-party ontologies 204, an additional inputs 206 Based on these inputs, the ontology generator 208 creates an ontology graph 210 that represents various relations between entities of computational instructions that have been executed by a computer/processor. These entities can include files, executable binary, processes, domain names, IP addresses, etc.

The ontology summary system 200 also has a query generator 214 that creates a query 216 based on values from a telemetry graph database 212, which stores graphs/patterns that represent respective malicious behaviors. The query 216 includes a query graph that is compared to various portions of the ontology graph 210 by the query processor 218. This comparison can be based on the topology (e.g., the spatial relations) and content (e.g., values of the vertices/nodes and relations expressed by the edges). When a match is found, the portion of the ontology graph 210 that matches the query graph is returned as subgraph 220.

The remainder of the ontology summary system 200 provides a summary 232 of subgraph 220 and then validates the summary and displays it in a graphical user interface (GUI) 236. First, the attack vector generator 222 converts the subgraph 220 of detected malware identified during penetration testing into a plurality of attack vectors 224. An attack vector is a specific route or method that malicious actors could employ to exploit vulnerabilities within a system, network, application, or device. It serves as a meticulously mapped-out pathway that outlines the sequence of steps an attacker might follow to compromise the intended target. The attack vectors with assist in the identification of potential weaknesses that necessitate mitigation to fortify the defenses of a system. These attack vectors encompass a wide array of techniques that can be categorized into various classes. Network-based attacks, for instance, revolve around leveraging vulnerabilities present in network protocols, services, or devices. Examples of these encompass activities such as network sniffing, distributed denial of service (DDOS) attacks, and the execution of Man-in-the-Middle (MitM) attacks that intercept communications.

In an example, during web-based attacks, penetration testing can detect tactics such as cross-site scripting (XSS), where attackers inject malicious scripts into web pages, and SQL injection, which involves manipulating databases through improperly sanitized inputs. Additionally, common attack vectors that target operating systems can be exposed by exploiting known vulnerabilities to gain unauthorized access. Examples of such threats include privilege escalation attacks buffer overflow attacks, and the execution of arbitrary code.

The attack vectors 224 generated by the attack vector generator 222 can exemplify a category of attack vectors that hinge on manipulating individuals into revealing sensitive information. This grouping encompasses tactics like phishing, which deceives users into disclosing their credentials or other confidential data, and pretexting, a method involving the creation of fictitious scenarios to mislead individuals into sharing information. Thus, the attack vectors 224 can identify vulnerabilities in wireless networks characterize wireless attacks, that can be exploited by attackers, which lead to unauthorized access to Wi-Fi networks or the initiation of various malicious activities.

Using the attack vectors 224, a policy and configuration generator 226 then generates a policy 228 for the prompt generator 230. Policy 228 directs the prompt generator 230 regarding the substance (e.g., the attack vectors 224) and style of the summary 232 to be created by the prompt generator 230. Policy 228 can include a comprehensive list of known attack vectors relevant to the system or software in consideration. This list could contain vulnerabilities, exploits, malware, and social engineering tactics. For each attack vector identified, policy 228 outlines which specific security measures and configurations are necessary to mitigate or prevent any associated attacks. These measures could encompass updated configurations for network appliances in the wireless network, security controls, wireless network configurations, and network access controls.

Additionally, the generated policy 228 could include mappings between attack vectors and corresponding security measures to ensure that appropriate steps are taken for each type of attack vector. The mapping could include configurations that are identified as being most effective against specific attack vectors, and malware that has previously penetrated the security system, allowing for the ability to take proactive steps to protect the network and the associated systems and data from malicious actions and attackers. In some examples, the prompt can identify a plurality of relationships between wireless appliances or nodes within the network. For example, the prompt can express more complex relationships between three or more nodes, thereby making broader connections that can help security analysts more quickly comprehend the information expressed by subgraph 220. Thus, security analysts can more quickly assess the a threat alert stimulated by identified penetration of the network system by malware.

The summary validator 234 checks the summary 232 to determine whether the summary is consistent with the subgraph 220, thereby ensuring that important aspects of the subgraph were not lost or misinterpreted in the translation from the subgraph 220 to the summary 232. For example, a machine learning (ML) method can convert the summary back to a graph that is compared to the subgraph 220 to determine whether features of the subgraph have been preserved.

Additionally, the summary 232 can be displayed in the GUI 236. The GUI 236 can include both the text of the summary 232 and a visual representation of the subgraph 220. The subgraph 220 provides ground truth, and the summary 232 provides a more easily comprehended mechanism for understanding the subgraph 220. According to certain non-limiting examples, a user can select a portion of the text of the summary 232, and in response, the GUI 236 highlights a corresponding portion of the subgraph associated with the selected text. Thus, starting from the text of the summary, a security analyst can quickly find the relevant features in the subgraph 220 that correspond to portions of the text of the summary. Then referring to the corresponding region of the subgraph 220, the security analyst can verify that, for the relevant features, the relations expressed in the text are consistent with the corresponding region of the subgraph 220, thereby confirming a correct understanding of the threat.

FIG. 3 illustrates an example process for penetration testing for optimization of network security policies in accordance with some embodiments of the present technology.routine 300 Although the example routine 300 depicts a particular sequence of operations, the sequence may be altered without departing from the scope of the present disclosure. For example, some of the operations depicted may be performed in parallel or in a different sequence that does not materially affect the function of the routine 300. In other examples, different components of an example device or system that implements the routine 300 may perform functions at substantially the same time or in a specific sequence.routine 300 routine 300 routine 300

According to some examples, the routine 300 includes determining by a security management service that one or more cybersecurity threats successfully penetrated a security service protecting a pseudo-target in a penetration testing environment at step 302. For example, the threat management service 102 illustrated in FIG. 1 may determine by a security management service 108 that one or more network threats 132 such as cybersecurity threats successfully penetrated a security service protecting a pseudo-target in a penetration testing environment. The security management service automatically initiates penetration testing based on the one or more cybersecurity threats that successfully penetrated the security service and identifies a set of updated adjustments to the policy, based on successful penetrations of the one or more cybersecurity threats.

The process of updating a current policy via the threat management service 102, in response to the detection of malware that has breached a security service protecting a pseudo-target within a penetration testing environment unfolds through a series of cohesive steps. As soon as the breach is identified, the threat management service 102 conducts a thorough analysis to comprehend the extent and characteristics of the intrusion into the network 104. The analysis involves dissecting the behavior of the detected malware, evaluating its impact on the pseudo-target, and pinpointing potential areas of compromise. Armed with a comprehensive understanding of the behavioral characterization of the penetrating malware, the threat management service 102 devises an adaptive strategy tailored to neutralize the specific malware and curtail its effects to the network 104. The adaptive strategy can translate into a targeted refinement of the existing security policy, meticulously addressing the vulnerabilities that the malware exploited during its breach. Adjustments to the policy can include enhancements to the detection of instruction and prevention of malware previously detected, reinforcement of network segmentation, bolstering access controls, and potentially isolating affected systems to impede any further lateral movement of the malware.

In some examples, behavioral data gleaned from the breach incident enrich the penetration testing environment's authenticity, allowing for the mirroring of real-world scenarios and fortifying its accuracy. The behavioral data can assist with informing the threat management service 102 of more robust policies and countermeasures to thwart future attacks, ensuring that the system's defense mechanisms evolve in direct response to emerging threats.

In some examples, the updated policies can undergo rigorous testing within the confines of the penetration testing environment. The threat management service 102 can employ the treat threat research service 112 to simulate a variety of attack scenarios to validate the policy's efficacy against similar instances of malware infiltration during continuous monitoring and analysis.

According to some examples, the routine 300 includes analyzing by the security management service the one or more cybersecurity threats that successfully penetrated the security service to characterize the one or more cybersecurity threats at step 304. For example, the threat management service 102 illustrated in FIG. 1 may analyze by the security management service 108 the network threats 132 that successfully penetrated the security service to characterize the one or more cybersecurity threats associated with the network threats 132.

In some examples, analyzing one or more cybersecurity threats that successfully penetrated the security service and generating the update of the policy used by the security management service 108 is performed using an LLM. The LLM can be made aware of a current policy used by the security service and prompted to analyze one or more cybersecurity threats to generate an update of the current policy. During the analysis, a threat score can be applied by the LLM to each of the network threats 132, which quantifies a risk level posed by each of the one or more cybersecurity threats and prioritizes one or more preventative actions to reduce the penetration of the one or more cybersecurity threats based on the threat score. Accordingly, the security management service 108 can employ classifications of one or more cybersecurity threats into one or more threat categories based on characterizations of each of the one or more cybersecurity threats. The security management service 108 can further automatically generate a threat score by evaluating a ranking of these classifications of one or more cybersecurity threats.

Further, the routine 300 comprises generating by the LLM additional variants guided by the analyzing the one or more cybersecurity threats that successfully penetrated the security service. For example, the LLM may generate additional variants guided by analyzing one or more cybersecurity threats that successfully penetrated the security service.

Further, the routine 300 includes deploying at least a portion of the additional variants to observe the additional variants in the penetration testing environment. For example, the threat management service 102 illustrated in FIG. 1 may deploy at least a portion of the additional variants to observe the additional variants in the penetration testing environment. The penetration testing environment has been updated with the generated policy used by the security service that is intended to prevent the one or more cybersecurity threats from penetrating the security service.

Further, the routine 300 includes analyzing the results of the additional variants in the penetration testing environment. For example, the threat research service 112 illustrated in FIG. 1 may analyze the results of the additional variants in the penetration testing environment, generated by the LLM.

Further, the routine 300 includes applying the analysis of the results of the additional variants in the penetration testing environment to aid the generating the update of the policy used by the security service. For example, the threat management service 102 illustrated in FIG. 1 may employ the policy management service 106 to apply the analysis of the results of the additional variants in the penetration testing environment to aid in generating the update of the current policy used by the security service. The policy management service 106 can generate an updated policy that includes the additional variants and remedial actions to the detected malware that penetrated the pseudo network environment received from the remedial action service 110.

Further, the routine 300 includes identifying a plurality of patterns related to successful previous penetrations of one or more cybersecurity threats. For example, the threat research service 112 illustrated in FIG. 1 may identify a plurality of patterns related to successful previous penetrations of one or more cybersecurity threats.

Further, the routine 300 includes providing a plurality of recommendations based on the plurality of patterns. For example, the remedial action service 110 illustrated in FIG. 1 may provide a plurality of recommendations based on the plurality of patterns that identify patterns in one or more attack vectors.

According to some examples, the routine 300 includes generating by the security management service an update of a policy used by the security service that would prevent the one or more cybersecurity threats from penetrating the security service based on the analysis of the one or cybersecurity threats at step 306. For example, the threat management service 102 illustrated in FIG. 1 may generate by the security management service an update of a policy used by the security service that would prevent one or more cybersecurity threats from penetrating the security service based on the analysis of the one or cybersecurity threats.

In some examples, an ontology graph 210 illustrated in FIG. 2 can illuminate a security system's attack surface during penetration testing, highlighting entry points in the security system that demand heightened attention, as it relates to the cybersecurity threats detected. The ontology graph 210 can provide an analysis of dependencies between components revealing potential ripple effects of an attack. The ontology graph 210 can further utilize pattern recognition, to identify recurring vulnerabilities or misconfigurations of the security management service 108 of FIG. 1. Leveraging these patterns, it generates actionable recommendations for security enhancements, forming the basis for a robust security policy encompassing access control, data encryption, and incident response.

In some examples, as this graph identifies recurring attack patterns and tactics employed by malicious actors, the security management service 108 as shown in FIG. 1 can gain invaluable insights into potential vulnerabilities. Through penetration testing, the ontology graph 210 as shown in FIG. 2 can generate new variants of the cybersecurity threats detected during penetration testing. The new malware variants can then be implemented through a new attack scenario during penetration testing, to unearth additional vulnerabilities through the ontology graph's analysis. Following penetration testing, identified vulnerabilities in the authentication process can prompt the security management service 108 to immediate refine the policy.

Figure 4A:
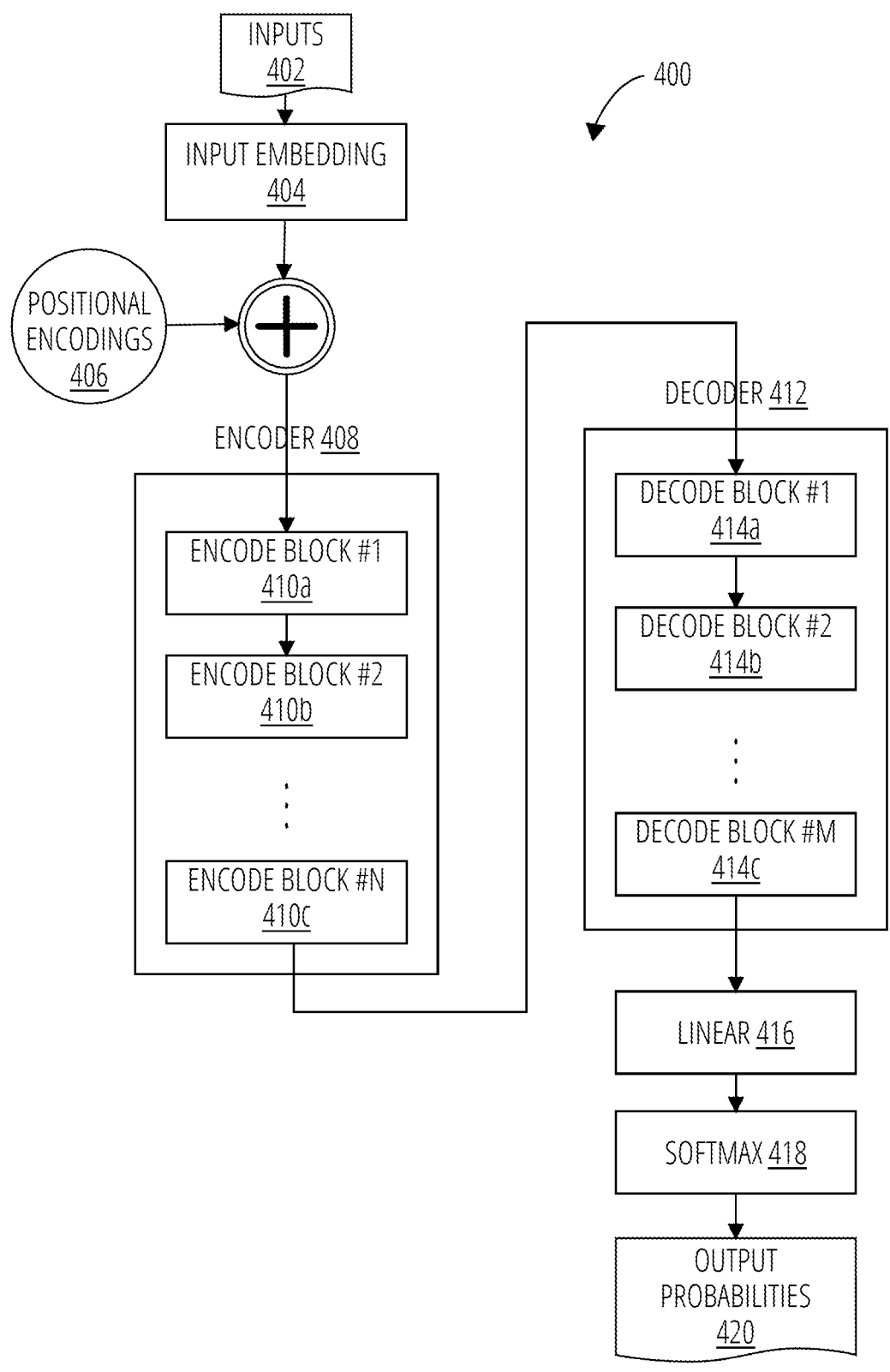
FIG. 4A illustrates a block diagram for an example of a transformer neural network architecture in accordance with some embodiments of the present technology.

FIG. 4A illustrates a block diagram for an example of a transformer neural network architecture, in accordance with certain embodiments. As discussed above, the prompt generator 230 in FIG. 2 can use a transformer architecture 400, such as a Generative Pre-trained Transformer (GPT) model. Additionally or alternatively, the prompt generator 230 can include a Bidirectional Encoder Representations from Transformers (BERT) model. According to certain non-limiting examples, the transformer architecture 400 is illustrated in FIG. 4A through FIG. 4C as including inputs 402, an input embedding block 404, positional encodings 406, an encoder 408 (e.g., encode blocks 410a, 410b, and 410c), a decoder 412 (e.g., decode blocks 414a, 414b, and 414c), a linear block 416, a softmax block 418, and output probabilities 420.

The input embedding block 404 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 404 can be learned embeddings to convert the input tokens and output tokens to vectors of dimension that have the same dimension as the positional encodings, for example.

The positional encodings 406 provide information about the relative or absolute position of the tokens in the sequence. According to certain non-limiting examples, the positional encodings 406 can be provided by adding positional encodings to the input embeddings at the inputs to the encoder 408 and decoder 412. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 4B:
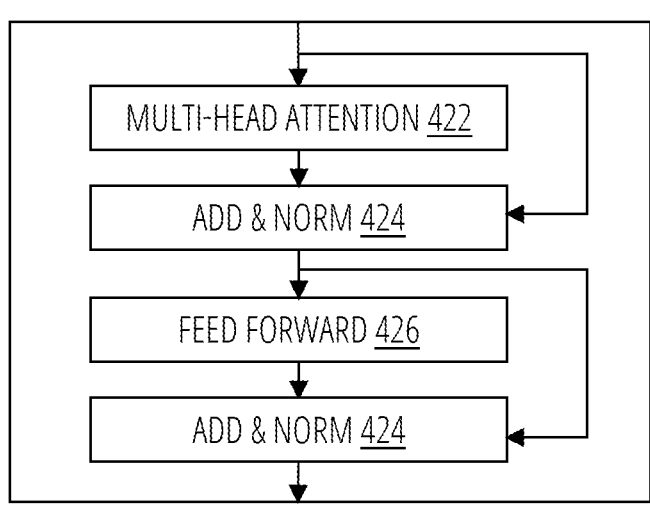
FIG. 4B illustrates a block diagram for an example of an encoder of the transformer neural network architecture in accordance with some embodiments of the present technology.
Figure 4C:
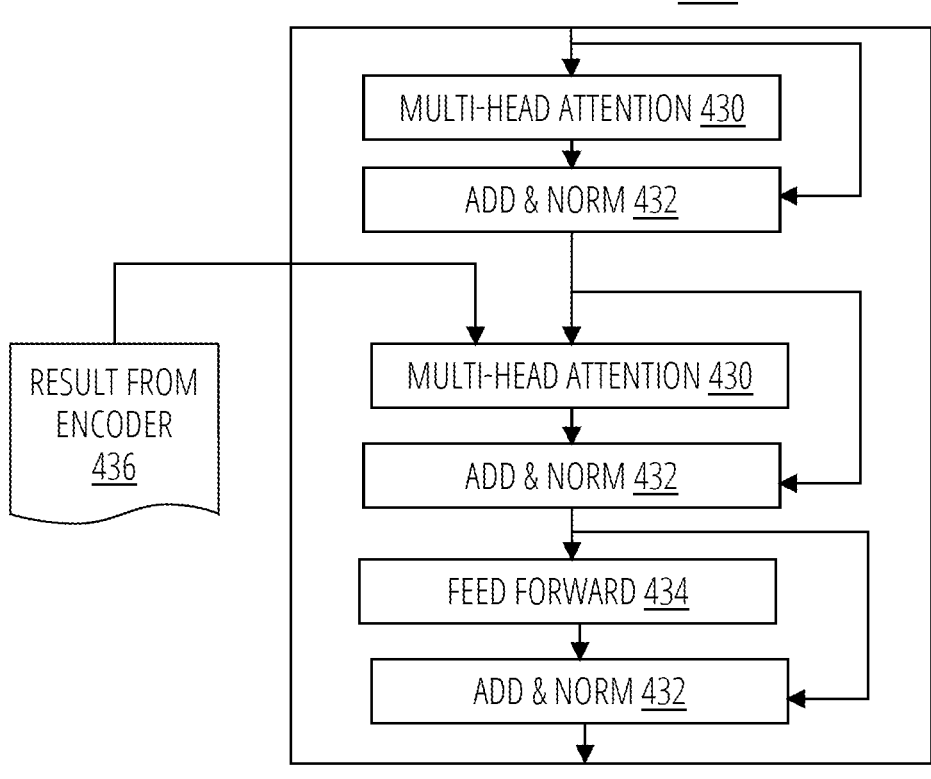
FIG. 4C illustrates a block diagram for an example of a decoder of the transformer neural network architecture in accordance with some embodiments of the present technology.

FIG. 4B illustrates a block diagram for an example of an encoder of the transformer neural network architecture, in accordance with certain embodiments.

The encoder 408 uses stacked self-attention and point-wise, fully connected layers. The encoder 408 can be a stack of N identical layers (e.g., N=6), and each layer is an encode block 410, as illustrated by encode block 410a shown in FIG. 4B. Each encode block 410 has two sub-layers: (i) a first sub-layer has a multi-head attention block 422 and (ii) a second sub-layer has a feed forward block 426, which can be a position-wise fully connected feed-forward network. The feed forward block 426 can use a rectified linear unit (ReLU).

The encoder 408 uses a residual connection around each of the two sub-layers, followed by an add & norm block 424, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer Layer-Norm(x+Sublayer(x)), where Sublayer(x) is the function implemented by the sub-layer). To facilitate these residual connections, all sub-layers in the model, as well as the embedding layers, produce output data having a same dimension.

FIG. 4C illustrates a block diagram for an example of a decoder of the transformer neural network architecture, in accordance with certain embodiments.

Similar to the encoder 408, the decoder 412 uses stacked self-attention and point-wise, fully connected layers. The decoder 412 can also be a stack of M identical layers (e.g., M=6), and each layer is a decode block 414, as illustrated by decode block 414a shown in FIG. 4C. In addition to the two sub-layers (i.e., the sublayer with the multi-head attention block 422 and the sub-layer with the feed-forward block 426) found in the encode block 410a, the decode block 414a can include a third sub-layer, which performs multi-head attention over the output of the encoder stack. Similar to the encoder 408, the decoder 412 uses residual connections around each of the sub-layers, followed by layer normalization. Additionally, the sub-layer with the multi-head attention block 422 can be modified in the decoder stack to prevent positions from attending to subsequent positions. This masking, combined with fact that the output embeddings are offset by one position, ensures that the predictions for position i can depend only on the known output data at positions less than i.

The linear block 416 can be a learned linear transformation. For example, when the transformer architecture 400 is being used to translate from a first language into a second language, the linear block 416 projects the output from the last decode block 414c into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 418 then turns the scores from the linear block 416 into output probabilities 420 (which add up to 1.0). In each position, the index provides for the word with the highest probability, and then map that index to the corresponding word in the vocabulary. Those words then form the output sequence of the transformer architecture 400. The softmax operation is applied to the output from the linear block 416 to convert the raw numbers into the output probabilities 420 (e.g., token probabilities), which are used in the process of generating the summary 232 based on the prompt generator, generating the policy 228.

Figure 5A:
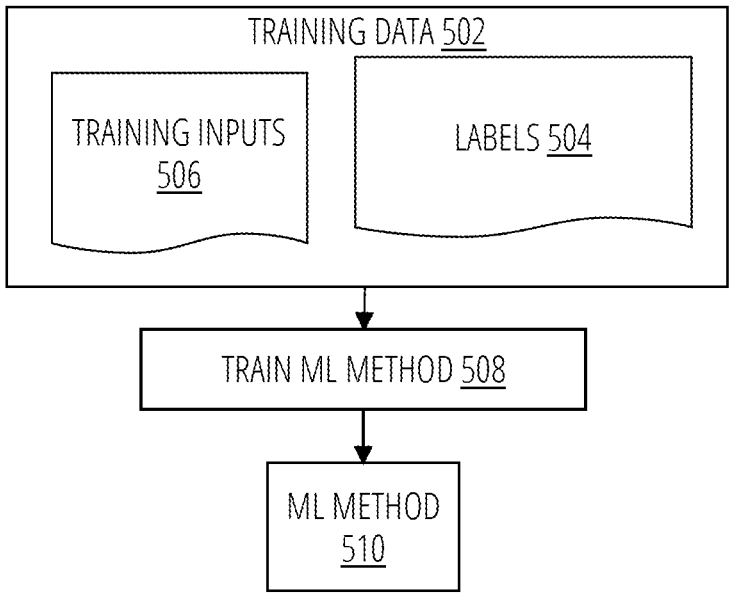
FIG. 5A illustrates a flow diagram for an example of a method of training a neural network in accordance with some embodiments of the present technology.

FIG. 5A illustrates an example of training an ML method 510 in accordance with certain embodiments. In step 508, training data 502, which includes the labels 504 and the training inputs 506) is applied to train the ML method 510. For example, the ML method 510 can be an artificial neural network (ANN) that is trained via supervised learning using a backpropagation technique to train the weighting parameters between nodes within respective layers of the ANN. In supervised learning, the training data 502 is applied as an input to the ML method 510, and an error/loss function is generated by comparing the output from the ML method 510 with the labels 504. The coefficients of the ML method 510 are iteratively updated to reduce an error/loss function. The value of the error/loss function decreases as outputs from the ML method 510 increasingly approximate the labels 504. In other words, ANN infers the mapping implied by the training data, and the error/loss function produces an error value related to the mismatch between the labels 504 and the outputs from the ML method 510 that are produced as a result of applying the training inputs 506 to the ML method 510.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, nonparametric methods, and particle swarm optimization, can also be used for training the ML method 510.

The training 508 of the ML method 510 can also include various techniques to prevent overfitting to the training data 502 and for validating the trained ML method 510. For example, bootstrapping and random sampling of the training data 502 can be used during training.

In addition to supervised learning used to initially train the ML method 510, the ML method 510 can be continuously trained while being used by using reinforcement learning based on the network measurements and the corresponding configurations used on the network. The ML method 510 can be cloud-based and trained using network measurements and the corresponding configurations from other networks that provide feedback to the cloud.

Further, other machine learning (ML) algorithms can be used for the ML method 510, and the ML method 510 is not limited to being an ANN. For example, there are many machine-learning models, and the ML method 510 can be based on machine-learning systems that include generative adversarial networks (GANs) that are trained, for example, using pairs of network measurements and their corresponding optimized configurations.

As understood by those of skill in the art, machine-learning-based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 5B:
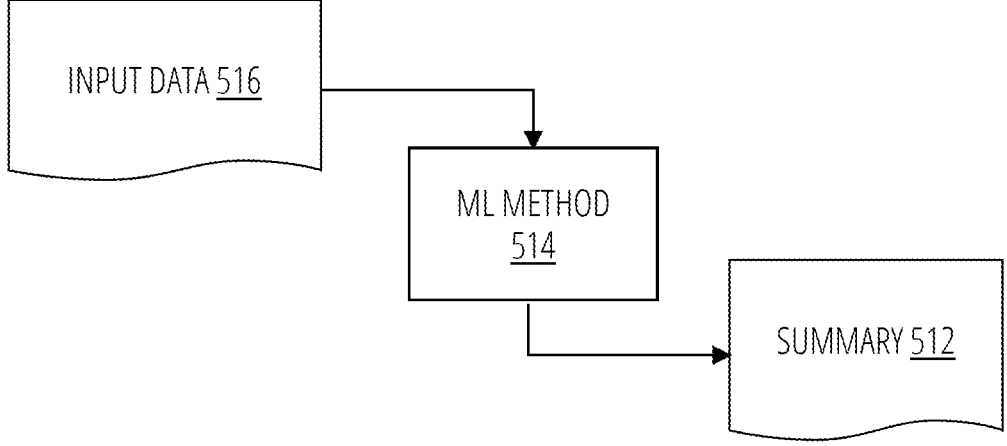
FIG. 5B illustrates a flow diagram for an example of a method of using the trained neural network in accordance with some embodiments of the present technology.

FIG. 5B illustrates an example of using the trained ML method 510. The input data 516 are applied to the trained ML method 510 to generate the outputs, which can include the summary 512.

Figure 6:
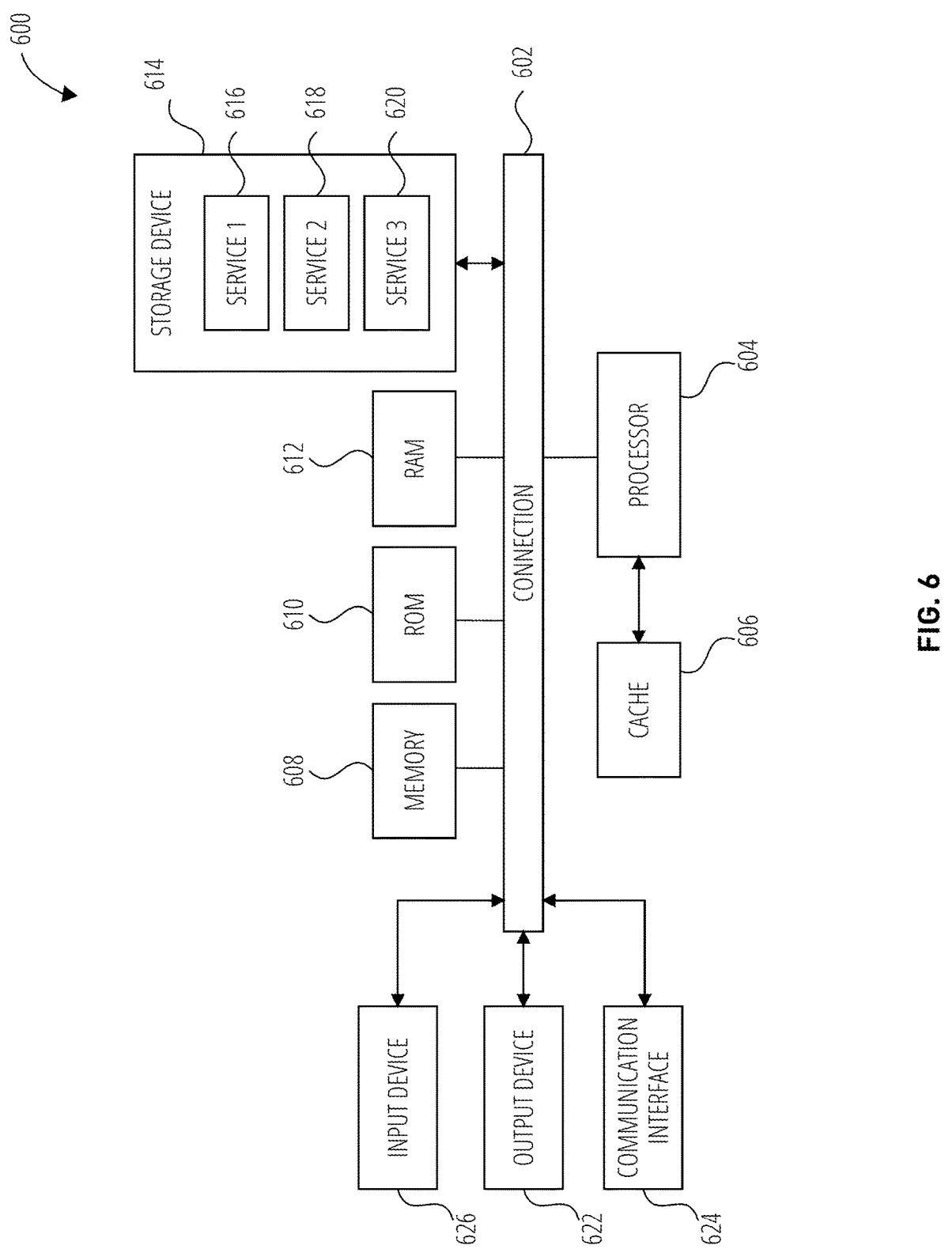
FIG. 6 illustrates a block diagram for an example of a computing device in accordance with some embodiments of the present technology.

FIG. 6 shows an example of computing system 600, which can be for example any computing device making up the system network 104 of FIG. 1, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (central processing unit (CPU) or processor) 604 and connection 602 that couples various system components including system memory 608, such as read-only memory (ROM) 610 and random access memory (RAM) RAM 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method for penetration testing for optimization of network security policies, the method comprising: determining, by a security management service, that one or more cybersecurity threats successfully penetrated a security service protecting a pseudo-target in a penetration testing environment; analyzing, by the security management service, the one or more cybersecurity threats that successfully penetrated the security service to characterize the one or more cybersecurity threats; and generating, by the security management service, an update of a policy used by the security service that would prevent the one or more cybersecurity threats from penetrating the security service based on the analysis of the one or cybersecurity threats.

Aspect 2. The method of aspect 1, wherein the analyzing the one or more cybersecurity threats that successfully penetrated the security service and the generating the update of the policy used by the security service is performed using a large language model (LLM).

Aspect 3. The method of aspect 2, wherein the LLM is aware of a current policy used by the security service, and the LLM is prompted to analyze the one or more cybersecurity threats, and to generate the update of the policy.

Aspect 4. The method of aspect 2, further comprising: generating additional variants guided by the analyzing the one or more cybersecurity threats that successfully penetrated the security service.

Aspect 5. The method of aspect 4, further comprising: deploying at least a portion of the additional variants to observe the additional variants in the penetration testing environment; analyzing results of the additional variants in the penetration testing environment; and applying the analysis of the results of the additional variants in the penetration testing environment aid the generating the update of the policy used by the security service.

Aspect 6. The method of aspect 4, further comprising: deploying at least a portion of the additional variants to observe the additional variants in the penetration testing environment, wherein the penetration testing environment has been updated with the generated policy used by the security service that is intended to prevent the one or more cybersecurity threats from penetrating the security service.

Aspect 7. The method of aspect 2, wherein the security management service is configured to instruct the LLM to: identify a plurality of patterns related to successful previous penetrations of the one or more cybersecurity threats; and provide a plurality of recommendations based on the plurality of patterns, wherein the plurality patterns identify patterns in one or more attack vectors.

Aspect 8. The method of aspect 1, wherein the security management service automatically initiates penetration testing based on the one or more cybersecurity threats that successfully penetrated the security service and identifies a set of updated adjustments to the policy, based on successful penetrations of the one or more cybersecurity threats.

Aspect 9. The method of aspect 1, wherein the security management service employs classifications of the one or more cybersecurity threats into one or more threat categories based on characterizations of each of the one or more cybersecurity threats, and automatically generates a threat score by evaluating a ranking of these classifications of the one or more cybersecurity threats.

Aspect 10. The method of aspect 9, wherein the threat score quantifies a risk level posed by each of the one or more cybersecurity threats and prioritizes one or more preventative actions to reduce the penetration of the one or more cybersecurity threats based on the threat score.

Aspect 11. The method of aspect 9, wherein the security management service utilizes the one or more characterizations of the one or more cybersecurity threats generated to generate security policies, encompassing adjustments to the policy automatically.

Aspect 12. A network device comprising: one or more memories having computer-readable instructions stored therein; and one or more processors configured to execute the computer-readable instructions to: determine, by a security management service, that one or more cybersecurity threats successfully penetrated a security service protecting a pseudo-target in a penetration testing environment; analyze, by the security management service, the one or more cybersecurity threats that successfully penetrated the security service to characterize the one or more cybersecurity threats; and generate, by the security management service, an update of a policy used by the security service that would prevent the one or more cybersecurity threats from penetrating the security service based on the analysis of the one or cybersecurity threats.

Aspect 13. The network device of aspect 12, wherein the analyzing the one or more cybersecurity threats that successfully penetrated the security service and the generating the update of the policy used by the security service is performed using a large language model (LLM).

Aspect 14. The network device of aspect 12, wherein the LLM is aware of a current policy used by the security service, and the LLM is prompted to analyze the one or more cybersecurity threats, and to generate the update of the policy.

Aspect 15. The network device of aspect 12, further comprising: generating additional variants guided by the analyzing the one or more cybersecurity threats that successfully penetrated the security service.

Aspect 16. The network device of aspect 12, further comprising: deploying at least a portion of the additional variants to observe the additional variants in the penetration testing environment; analyzing results of the additional variants in the penetration testing environment; and applying the analysis of the results of the additional variants in the penetration testing environment aid the generating the update of the policy used by the security service.

Aspect 17. The network device of aspect 12, further comprising: deploying at least a portion of the additional variants to observe the additional variants in the penetration testing environment, wherein the penetration testing environment has been updated with the generated policy used by the security service that is intended to prevent the one or more cybersecurity threats from penetrating the security service.

Aspect 18. The network device of aspect 12, wherein the security management service is configured to instruct the LLM to: identify a plurality of patterns related to successful previous penetrations of the one or more cybersecurity threats; and provide a plurality of recommendations based on the plurality of patterns, wherein the plurality patterns identify patterns in one or more attack vectors.

Aspect 19. The network device of aspect 12, wherein the security management service automatically initiates penetration testing based on the one or more cybersecurity threats that successfully penetrated the security service and identifies a set of updated adjustments to the policy, based on successful penetrations of the one or more cybersecurity threats.

Aspect 20. The network device of aspect 12, wherein the security management service employs classifications of the one or more cybersecurity threats into one or more threat categories based on characterizations of each of the one or more cybersecurity threats, and automatically generates a threat score by evaluating a ranking of these classifications of the one or more cybersecurity threats.

Aspect 21. The network device of aspect 12, wherein the threat score quantifies a risk level posed by each of the one or more cybersecurity threats and prioritizes one or more preventative actions to reduce the penetration of the one or more cybersecurity threats based on the threat score.

Aspect 22. The network device of aspect 12, wherein the security management service utilizes the one or more characterizations of the one or more cybersecurity threats generated to generate security policies, encompassing adjustments to the policy automatically.

Aspect 23. A non-transitory computer-readable storage medium comprising computer-readable instructions, which when executed by one or more processors of a network appliance, cause the network appliance to: determine, by a security management service, that one or more cybersecurity threats successfully penetrated a security service protecting a pseudo-target in a penetration testing environment; analyze, by the security management service, the one or more cybersecurity threats that successfully penetrated the security service to characterize the one or more cybersecurity threats; and generate, by the security management service, an update of a policy used by the security service that would prevent the one or more cybersecurity threats from penetrating the security service based on the analysis of the one or cybersecurity threats.

Aspect 24. The non-transitory computer-readable storage medium of aspect 23, wherein the analyzing the one or more cybersecurity threats that successfully penetrated the security service and the generating the update of the policy used by the security service is performed using a large language model (LLM).

Aspect 25. The non-transitory computer-readable storage medium of aspect 23, wherein the LLM is aware of a current policy used by the security service, and the LLM is prompted to analyze the one or more cybersecurity threats, and to generate the update of the policy.

Aspect 26. The non-transitory computer-readable storage medium of aspect 23, wherein the one or more processors are further configured to: generate additional variants guided by the analyzing the one or more cybersecurity threats that successfully penetrated the security service.

Aspect 27. The non-transitory computer-readable storage medium of aspect 23, wherein the one or more processors are further configured to: deploy at least a portion of the additional variants to observe the additional variants in the penetration testing environment; analyze results of the additional variants in the penetration testing environment; and apply the analysis of the results of the additional variants in the penetration testing environment aid the generating the update of the policy used by the security service.

Aspect 28. The non-transitory computer-readable storage medium of aspect 23, wherein the one or more processors are further configured to: deploy at least a portion of the additional variants to observe the additional variants in the penetration testing environment, wherein the penetration testing environment has been updated with the generated policy used by the security service that is intended to prevent the one or more cybersecurity threats from penetrating the security service.

Aspect 29. The non-transitory computer-readable storage medium of aspect 23, wherein the security management service is configured to instruct the LLM to: identify a plurality of patterns related to successful previous penetrations of the one or more cybersecurity threats; and provide a plurality of recommendations based on the plurality of patterns, wherein the plurality patterns identify patterns in one or more attack vectors.

Aspect 30. The non-transitory computer-readable storage medium of aspect 23, wherein the security management service automatically initiates penetration testing based on the one or more cybersecurity threats that successfully penetrated the security service and identifies a set of updated adjustments to the policy, based on successful penetrations of the one or more cybersecurity threats.

Aspect 31. The non-transitory computer-readable storage medium of aspect 23, wherein the security management service employs classifications of the one or more cybersecurity threats into one or more threat categories based on characterizations of each of the one or more cybersecurity threats, and automatically generates a threat score by evaluating a ranking of these classifications of the one or more cybersecurity threats.

Aspect 32. The non-transitory computer-readable storage medium of aspect 23, wherein the threat score quantifies a risk level posed by each of the one or more cybersecurity threats and prioritizes one or more preventative actions to reduce the penetration of the one or more cybersecurity threats based on the threat score.

Aspect 33. The non-transitory computer-readable storage medium of aspect 23, wherein the security management service utilizes the one or more characterizations of the one or more cybersecurity threats generated to generate security policies, encompassing adjustments to the policy automatically.

What is claimed is:

1. A method comprising:
   determining, by a security management service, that one or more cybersecurity threats successfully penetrated a security service protecting a pseudo-target in a penetration testing environment;
   analyzing, by the security management service, the one or more cybersecurity threats that successfully penetrated the security service to characterize the one or more cybersecurity threats; and
   generating, by the security management service, an update of a policy used by the security service that would prevent the one or more cybersecurity threats from penetrating the security service based on the analysis of the one or more cybersecurity threats.

2. The method of claim 1, wherein the analyzing the one or more cybersecurity threats that successfully penetrated the security service and the generating the update of the policy used by the security service is performed using a large language model (LLM).

3. The method of claim 2, wherein the LLM inspects a current policy used by the security service, and the LLM is prompted to analyze the one or more cybersecurity threats, and to generate the update of the policy.

4. The method of claim 2, further comprising:
   generating additional variants related to the one or more cybersecurity threats that successfully penetrated the security service;
   deploying at least a portion of the additional variants to observe the additional variants in the penetration testing environment;
   analyzing results of the additional variants in the penetration testing environment; and
   applying the analysis of the results of the additional variants in the penetration testing environment aid the generating the update of the policy used by the security service.

5. The method of claim 4, further comprising:
   deploying at least a portion of the additional variants to observe the additional variants in the penetration testing environment, wherein the penetration testing environment has been updated with the generated policy used by the security service that is intended to prevent the one or more cybersecurity threats from penetrating the security service.

6. The method of claim 2, wherein the security management service is configured to instruct the LLM to:
   identify a plurality of patterns related to successful previous penetrations of the one or more cybersecurity threats; and

29 provide a plurality of recommendations based on the plurality of patterns, wherein the plurality patterns identify patterns in one or more attack vectors.

7. The method of claim 1, wherein the security management service employs classifications of the one or more cybersecurity threats into one or more threat categories based on characterizations of each of the one or more cybersecurity threats, and automatically generates a threat score by evaluating a ranking of these classifications of the one or more cybersecurity threats.

8. The method of claim 7, wherein the threat score quantifies a risk level posed by each of the one or more cybersecurity threats and prioritizes one or more preventative actions to reduce the penetration of the one or more cybersecurity threats based on the threat score.

9. A network device comprising:
one or more memories having computer-readable instructions stored therein; and
one or more processors configured to execute the computer-readable instructions to:
determine, by a security management service, that one or more cybersecurity threats successfully penetrated a security service protecting a pseudo-target in a penetration testing environment;
analyze, by the security management service, the one or more cybersecurity threats that successfully penetrated the security service to characterize the one or more cybersecurity threats; and
generate, by the security management service, an update of a policy used by the security service that would prevent the one or more cybersecurity threats from penetrating the security service based on the analysis of the one or cybersecurity threats.

10. The network device of claim 9, wherein the analyzing the one or more cybersecurity threats that successfully penetrated the security service and the generating the update of the policy used by the security service is performed using a large language model (LLM).

11. The network device of claim 10, wherein the LLM is aware of a current policy used by the security service, and the LLM is prompted to analyze the one or more cybersecurity threats, and to generate the update of the policy.

12. The network device of claim 9, further comprising:
generating additional variants related to the one or more cybersecurity threats that successfully penetrated the security service;
deploying at least a portion of the additional variants to observe the additional variants in the penetration testing environment;
analyzing results of the additional variants in the penetration testing environment; and
applying the analysis of the results of the additional variants in the penetration testing environment aid the generating the update of the policy used by the security service.

13. The network device of claim 12, further comprising:
deploying at least a portion of the additional variants to observe the additional variants in the penetration testing environment, wherein the penetration testing environment has been updated with the generated policy used by the security service that is intended to prevent the one or more cybersecurity threats from penetrating the security service.

14. The network device of claim 9, wherein the security management service is configured to instruct an LLM to:
identify a plurality of patterns related to successful previous penetrations of the one or more cybersecurity threats; and
provide a plurality of recommendations based on the plurality of patterns, wherein the plurality patterns identify patterns in one or more attack vectors.

15. The network device of claim 9, wherein the security management service employs classifications of the one or more cybersecurity threats into one or more threat categories based on characterizations of each of the one or more cybersecurity threats, and automatically generates a threat score by evaluating a ranking of these classifications of the one or more cybersecurity threats.

16. The network device of claim 15, wherein the threat score quantifies a risk level posed by each of the one or more cybersecurity threats and prioritizes one or more preventative actions to reduce the penetration of the one or more cybersecurity threats based on the threat score.

17. A non-transitory computer-readable storage medium comprising computer-readable instructions, which when executed by one or more processors of a network appliance, cause the network appliance to:
determine, by a security management service, that one or more cybersecurity threats successfully penetrated a security service protecting a pseudo-target in a penetration testing environment;
analyze, by the security management service, the one or more cybersecurity threats that successfully penetrated the security service to characterize the one or more cybersecurity threats; and
generate, by the security management service, an update of a policy used by the security service that would prevent the one or more cybersecurity threats from penetrating the security service based on the analysis of the one or cybersecurity threats.

18. The non-transitory computer-readable storage medium of claim 17, wherein the analyzing the one or more cybersecurity threats that successfully penetrated the security service and the generating the update of the policy used by the security service is performed using a large language model (LLM).

19. The non-transitory computer-readable storage medium of claim 18, wherein the LLM is aware of a current policy used by the security service, and the LLM is prompted to analyze the one or more cybersecurity threats, and to generate the update of the policy.

20. The non-transitory computer-readable storage medium of claim 17, wherein the one or more processors are further configured to:
generate additional variants guided by the analyzing of the one or more cybersecurity threats that successfully penetrated the security service.

* * * * *